(12) United States Patent
Eyres et al.

(10) Patent No.: US 10,083,229 B2
(45) Date of Patent: Sep. 25, 2018

(54) SYSTEM, METHOD, AND APPARATUS FOR PAIRING A SHORT DOCUMENT TO ANOTHER SHORT DOCUMENT FROM A PLURALITY OF SHORT DOCUMENTS

(75) Inventors: Greg Eyres, Victoria (AU); Vahit Hakan Hacigumus, San Jose, CA (US); Tobin J. Lehman, Cupertino, CA (US); H. Raymond Strong, Jr., San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 719 days.

(21) Appl. No.: 12/576,959

(22) Filed: Oct. 9, 2009

(65) Prior Publication Data

US 2011/0087701 A1    Apr. 14, 2011

(51) Int. Cl.
*G06F 7/00*      (2006.01)
*G06F 17/30*     (2006.01)

(52) U.S. Cl.
CPC .... *G06F 17/3069* (2013.01); *G06F 17/30011* (2013.01); *G06F 17/30705* (2013.01)

(58) Field of Classification Search
CPC .................................................. G06F 17/3069
USPC ......................................... 707/999.102, 736
See application file for complete search history.

(56) References Cited

U.S. PATENT DOCUMENTS

| | | | |
|---|---|---|---|
| 5,920,859 A | 7/1999 | Li | |
| 5,987,454 A | 11/1999 | Hobbs | |
| 5,991,751 A | 11/1999 | Rivette et al. | |
| 5,991,780 A | 11/1999 | Rivette et al. | |
| 6,070,133 A * | 5/2000 | Brewster | G06F 17/30696 704/9 |
| 6,081,262 A * | 6/2000 | Gill | G06T 11/60 707/E17.009 |
| 6,098,081 A | 8/2000 | Heidorn et al. | |

(Continued)

FOREIGN PATENT DOCUMENTS

JP          09282331        10/1997

OTHER PUBLICATIONS

Dumais et al. "Hierarchical Classification of Web Content." Annual ACM Conference on Research and Development in Information Retrieval, (2000), pp. 256-263.

(Continued)

*Primary Examiner* — Eliyah S Harper
(74) *Attorney, Agent, or Firm* — Kunzler, PC.

(57) ABSTRACT

A computer-implemented method for pairing a new document to a document from a plurality of documents. Embodiments include, for each of the new document and the plurality of documents, generating a vector of terms of interest uniquely associated with a document of the new document and the plurality of documents. For each term of interest, an associated element value of the vector is assigned as zero if the term of interest does not occur in the document and one otherwise. The method also includes, for each document from the plurality of documents, determining a similarity between the vectors. The method also includes selecting a document from the plurality of documents as related to the new document if the similarity between the vector for the new document and the vector for the document from the plurality of documents is greater than or equal to a threshold value.

16 Claims, 5 Drawing Sheets

(56) References Cited

U.S. PATENT DOCUMENTS

| | | | | |
|---|---|---|---|---|
| 6,356,864 | B1* | 3/2002 | Foltz | G06F 17/2785 434/353 |
| 6,775,677 | B1* | 8/2004 | Ando | G06F 17/3069 707/739 |
| 7,003,725 | B2 | 2/2006 | Castellanos et al. | |
| 7,158,983 | B2 | 1/2007 | Willse et al. | |
| 2003/0014398 | A1* | 1/2003 | Ohta | G06F 17/30864 |
| 2004/0049498 | A1* | 3/2004 | Dehlinger | G06F 17/2785 |
| 2004/0181511 | A1* | 9/2004 | Xu | G06F 17/30206 |
| 2004/0205461 | A1* | 10/2004 | Kaufman | G06F 17/2745 715/200 |
| 2005/0108203 | A1* | 5/2005 | Tang | G06F 17/30106 |
| 2006/0080311 | A1 | 4/2006 | Potok et al. | |
| 2006/0173560 | A1 | 8/2006 | Widrow | |
| 2006/0259481 | A1* | 11/2006 | Handley | G06F 17/2785 |
| 2007/0083509 | A1* | 4/2007 | Wu | G06F 17/30616 |
| 2008/0040347 | A1 | 2/2008 | Potok et al. | |
| 2009/0307213 | A1* | 12/2009 | Deng | G06F 17/30705 |
| 2010/0228730 | A1* | 9/2010 | Muller | G06F 17/30011 707/736 |

OTHER PUBLICATIONS

Hacigumus "Efficient Solution Design Mapping in Service Delivery." Proceedings of the 2008 IEEE Congress on Services Part II, (2008), pp. 216-217.

"System for and Method of Linking Product Representations with Intellectual Property Information." (May 2001), 13 pages, available at http://www.ip.com/pubview/IPCOM000004767D.

Koller et al. "Hierarchically Classifying Documents Using Very Few Words." Proceedings of the Fourteenth International Conference on Machine Learning, (1997), pp. 170-178.

Guha et al. "Merging the Results of Approximate Match Operations." Proceedings of the Thirtieth International Conference on Very Large Data Bases, vol. 30, (2004) pp. 636-647.

\* cited by examiner

SYSTEM, METHOD, AND APPARATUS FOR PAIRING A SHORT DOCUMENT TO ANOTHER SHORT DOCUMENT FROM A PLURALITY OF SHORT DOCUMENTS

BACKGROUND

Pairing two documents as "similar" is a difficult problem when the documents are short. Longer documents afford a searcher the luxury of comparing a more extensive vocabulary found in the long documents, but when the vocabulary is limited (such as by the size of short documents), standard methods of comparison are inefficient and produce unreliable results. In many cases, pairing short documents relies on manual comparison of the documents by a user. This method may lead to high-quality results, but becomes problematic when the number of documents is large.

One example of short documents that benefit from determining similarity is the construction of service offerings from pre-built services. Service providers provide services defined by service agreements to customers. These services are, in many cases, a collection of smaller services. The smaller services are often generic or semi-generic pre-built services that may be repeated several times within the same service offering or even be used within multiple agreements for multiple customers. A typical service offering may include several generic or semi-generic services along with one or more custom or semi-custom services.

Services, such as the generic services described above, often have accompanying descriptions that describe the service. For example, a service description may describe the inputs, function, and outputs of the service. These service descriptions are typically quite short. In many cases, the service descriptions are less than 500 words. In some cases, the service descriptions are under 50 words. Some service descriptions are arranged hierarchically, with levels corresponding to the significance of the associated text, and describing relationships between terms in the description.

Efficiently constructing a service offering often depends on breaking down the service offering into as few custom or semi-custom services as possible. By using previously defined services to meet the requirements of the service offering, the service provider may avoid unnecessary repetition in defining and implementing new services. To construct the service offering, a user must often consult a catalog of services to locate previously defined services that may be used as constituent parts of the service offering.

Some catalogs of services for large service providers are very large, containing hundreds or thousands of service descriptions. When using a large service catalog to construct a service offering, a user may have difficulty selecting optimal pre-defined services to construct the agreement. The level of experience and skill required to efficiently construct a service offering often grows as does the size of the service catalog. Consequently, constructed service offerings often fail to use the best pre-defined services to construct the service offering, and the best service offerings require employment of a highly skilled and experienced user.

SUMMARY

Embodiments of a computer-implemented method for pairing a new document to a document from a plurality of documents are described. Also embodiments are described for enqueuing more than one new document to be paired with the plurality of documents. In one embodiment, the computer-implemented method includes, for each of the new document and the plurality of documents, generating a vector uniquely associated with a document of the new document and the plurality of documents. The vector includes a number of elements equal to a number of terms of interest. For each term of interest, an associated element value of the vector is assigned as zero if the term of interest does not occur in the document and one if the term does occur in the document. The method also includes, for each document from the plurality of documents, determining a similarity between the vector for the new document and the vector for the document from the plurality of documents. The method also includes selecting a document from the plurality of documents as related to the new document if the similarity between the vector for the new document and the vector for the document from the plurality of documents is greater than or equal to a threshold value. Other embodiments of the computer-implemented method are also described.

Embodiments of a computer program product for merging a new document with a document from a plurality of documents are described. The computer program product includes a computer useable storage medium to store a computer readable program that, when executed on a computer, causes the computer to perform operations, including receiving a new document and, for each of the new document and each document of a plurality of documents, generating a vector uniquely associated with each of the documents of the plurality of documents and the new document. The vector includes a number of elements equal to a number of terms of interest. For each term of interest, an associated element value of the vector is assigned as zero if the term of interest does not occur in the document and one if the term does occur in the document. The operations also include, for each document from the plurality of documents, determining a similarity between the vector for the new document and the vector for the document from the plurality of documents. The operations also include selecting a document from the plurality of documents as related to the new document in response to determining that the similarity between the vector for the new document and the vector for the document from the plurality of documents is greater than or equal to a threshold value and determining that the similarity between the vector for the new document and the vector for the document from the plurality of documents is greater than or equal to the similarity between the vector for the new document and the vector for any other document from the plurality of documents. The operations also include merging the new document with the selected document if a document from the plurality of documents is selected. The operations also include submitting the merged document as a new document for pairing. If the embodiment includes a queue of new documents, one embodiment includes the operation of submitting the merged document behind other documents in the queue. Other embodiments of the computer program product are also described.

Embodiments of a system are also described. In one embodiment, the system includes a document repository to store a plurality of documents, a comparison engine, and a pairing engine. The comparison engine includes a vector generator and a similarity generator. The vector generator generates a vector for each of a new document and a document from the document repository. The vector comprises a number of elements equal to a number of terms of interest. For each term of interest, an associated element value of the vector is assigned as zero if the term of interest does not occur in the document and one if the term does occur in the document. The similarity generator determines a similarity between the document and the document from the document repository. The similarity is based on the vector for the new document and the vector for the document from the document repository. The pairing engine includes a document receiver, a document submitter, and a pair indicator. The document receiver receives the new document to be paired with the documents in the document repository. The document submitter submits the new document to the comparison engine and directs the comparison engine to determine a similarity between the new document and each document of the plurality of documents in the document repository. The pair indicator indicates a pair between the new document and a document in the document repository having the highest similarity with the new document if the similarity between the new document and the document in the document repository having the highest similarity with the new document is greater than or equal to a threshold value. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

In some embodiments, a vector is generated for a new document and compared to vectors generated for documents in a document repository. Elements of the vectors correspond to terms of interest, and indicate the presence of the terms of interest in the corresponding document. In some embodiments, a document from the document repository is marked as "similar" to the new document it the vector for the document has the highest cosine measurement of similarity with the vector for the new document.

Finding a similar existing document to the new document may be the ultimate purpose of the method. In some embodiments, however, the new document is merged with the similar document if the similarity between the documents is high enough. Merger creates a new document in the document repository. Merger fills the practical function of cleaning a document repository of unnecessary similar documents.

Figure 1:
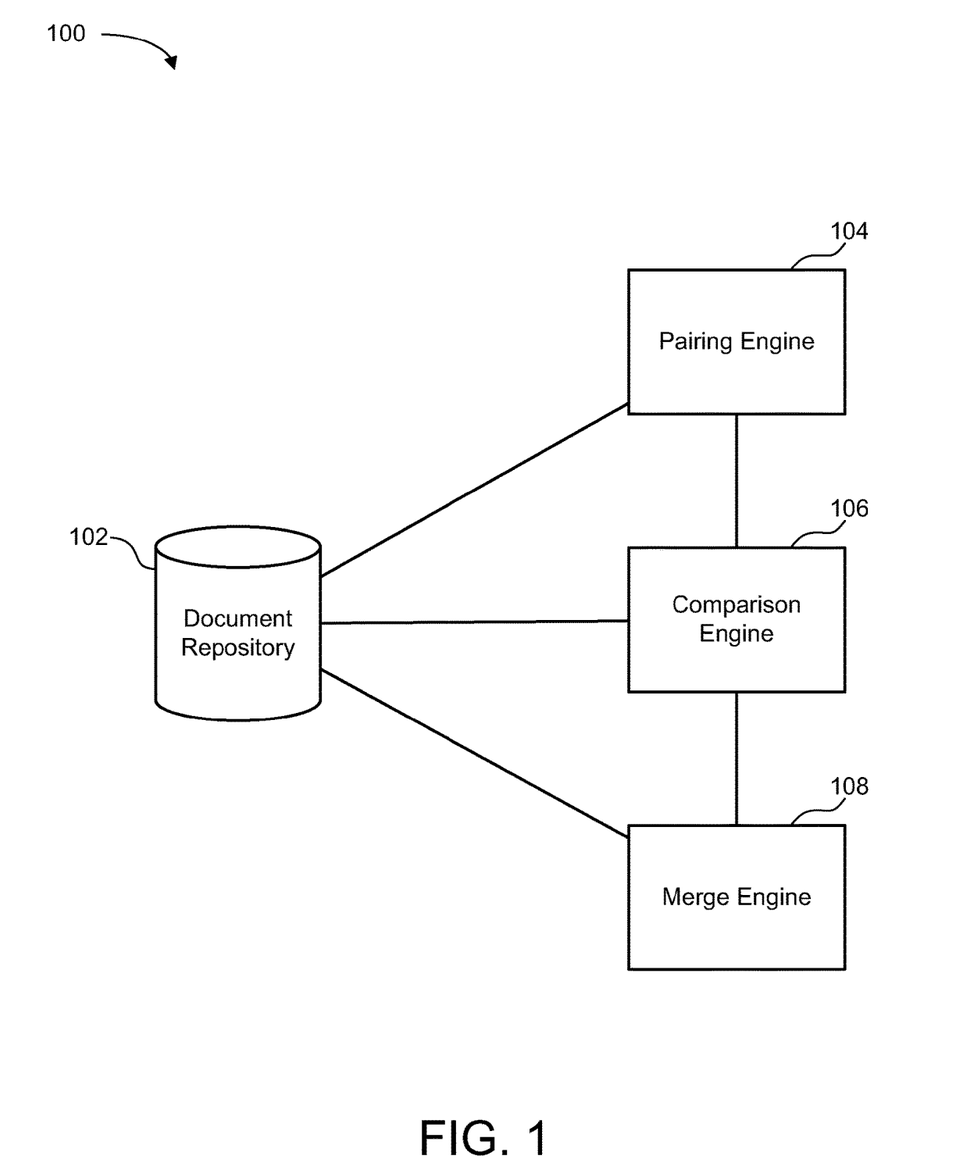
FIG. 1 depicts a schematic diagram of one embodiment of a system for mapping a new document to a document in a document repository.

FIG. 1 depicts a schematic diagram of one embodiment of a system 100 for mapping a new document to a document in a document repository 102. The system 100 includes the document repository 102, a pairing engine 104, a comparison engine 106, and a merge engine 108. The system 100 pairings and/or merges a new document with a document in the document repository 102.

The document repository 102, in some embodiments, contains one or more documents. In some embodiments, the documents are short. For example, the documents may be 500 words or less. In another example, the documents maybe 50 words or less. In some embodiments, the documents in the document repository 102 include hierarchical information. For example, a document may include more than one level, and a level within the document may indicate significance of a term and/or a relationship between terms.

The document repository 102 may be any type of device capable of storing one or more documents. For example, the document repository 102 may be a hard drive or a memory device. In another example, the document repository 102 may be a database.

In one embodiment, the pairing engine 104 receives a new document to be paired with documents in the document repository 102. The pairing engine 104 is in communication with the comparison engine 106 and receives an indication from the comparison engine 106 of the most similar document within the document repository 102 to the new document. The pairing engine 104 is described in greater detail in relation to FIG. 3.

The comparison engine 106, in one embodiment, compares the new document to documents in the document repository 102. The comparison engine 106 determines how similar the new document is to the document in the document repository 102. The comparison engine 106 is in communication with the document repository 102. The comparison engine 106 is described in greater detail in relation to FIG. 2.

The merge engine 108, in some embodiments, receives a new document to be merged with documents in the document repository 102. The merge engine 108 is in communication with the comparison engine 106 and receives an indication from the comparison engine 106 of the most similar document within the document repository 102 to the new document. The merge engine 108 merges the new document with the most similar document from the document repository 102. The merge engine 108 is described in greater detail in relation to FIG. 4.

Figure 2:
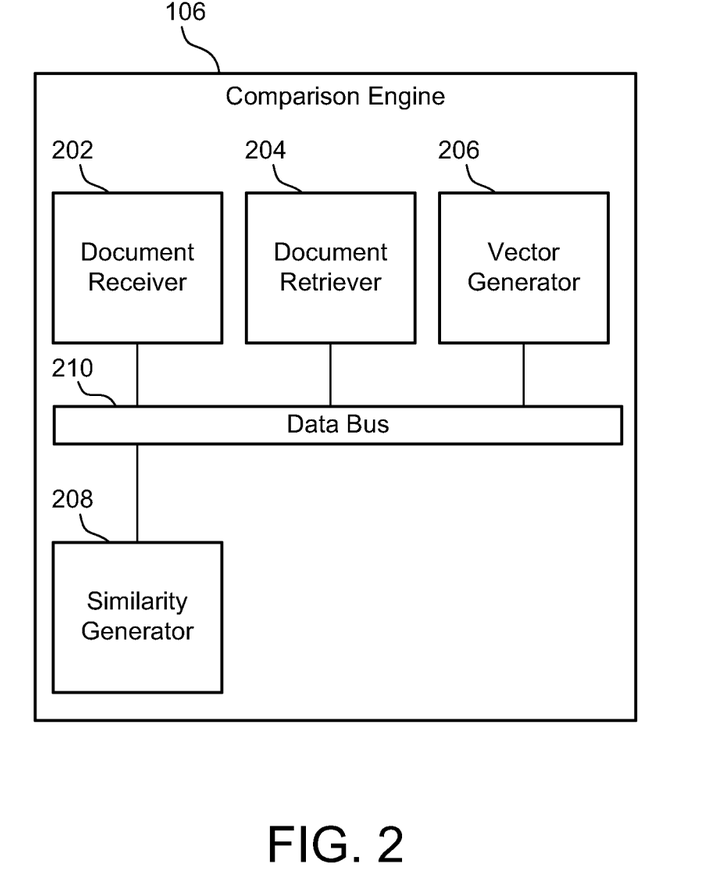
FIG. 2 depicts a schematic diagram of one embodiment of comparison engine of FIG. 1.

FIG. 2 depicts a schematic diagram of one embodiment of comparison engine 106 of FIG. 1. The comparison engine 106 includes a document receiver 202, a document retriever 204, a vector generator 206, a similarity generator 208, and a data bus 210. The comparison engine 106 compares a new document to documents in the document repository 102.

The document receiver 202, in one embodiment, receives a new document for comparison with documents from the document repository 102. The document receiver 202 may receive the new document from any source. For example, the document receiver may receive the new document from the pairing engine 104 and/or the merge engine 108.

In one embodiment, the document retriever 204 retrieves a document for comparison from the document repository 102. In some embodiments, the document retriever 204 acts under the direction of an external source, such as the pairing engine 104 or the merge engine 108. In another embodiment, the document retriever 204 selects a document for comparison from the document repository 102 using its own internal logic. In one embodiment, the document retriever 204 systematically accesses and retrieves every document in the document repository 102 for comparison to the new document.

The vector generator 206, in one embodiment, generates a vector for a document. The comparison engine 106 may use the vector generator 206 to generate a unique vector for each of the documents in the document repository 102 and for the new document. Each vector generated by the vector generator 206 includes a number of elements to equal to a number of terms of interest that may be found within the documents. For example, there may be 100 terms of interest, and vectors generated by the vector generator 206 are 100 element vectors.

In some embodiments, the vectors generated by the vector generator 206 have elements that are binary. An element having a value of zero indicates that the term of interest relating to that element is not present in the document. An element having a value of one indicates that the term of interest relating to that element occurs at least once in the document. Limiting the elements of the vectors to indicate a presence or absence of terms of interest rather than the number of occurrences of the terms of interest in a document simplifies the comparison process and results in more efficient comparison for short documents.

In certain embodiments, entries in a vector generated by the vector generator 206 are weighted by a position of the term in a corresponding document. The position may refer to the position relative to pre-specified key terms, position in a structural hierarchy associated with the document, history of use of the term in previous pairings, other position-related information, or hybrids of the above position information. The weight attached to the terms indicates that the position of the term in the document implies that the term is relatively more important than other terms in the document. More heavily-weighted terms are given more significance by the similarity generator 208 in determining the similarity between documents.

The similarity generator 208, in one embodiment, generates a similarity between the new document and the document from the document repository 102. The similarity generated by the similarity generator 208 is a numerical representation of similarity. The similarity generator 208 calculates a distance between the vector associated with the new document and the vector associated with the document from the document repository 102 and outputs the distance as the similarity between the documents. Similarity can also represent closeness rather than distance.

In one embodiment, the similarity generator 208 determines the closeness between vectors by calculating a cosine measurement of similarity between the vector for the new document and the vector for the document from the plurality of documents. In this embodiment, similarity=$\cos(\theta)=(A \cdot B)/(\|A\| \|B\|)$, where A represents the vector associated with the new document and B represents the vector associated with the document from the document repository. Note that in this case, a corresponding distance would be given by the angle $\theta = \arccos(\text{similarity})$. In an alternative embodiment, the closeness between vectors is calculated as $(A \cdot B)/\max(A \cdot I, I \cdot B)$, where I is the vector with all entries equal to 1.

The data bus 210 provides a communication pathway within the comparison engine 106 for various elements of the comparison engine 106. The data bus 210 may be any type of data communication system, including, but not limited to, a hardware bus, a wired connection, a network, a mesh system, and a wireless communication system. In some embodiments, the data bus 210 may include a combination of types of data communication system.

The comparison engine 106 outputs the similarity generated by the similarity generator 208. The similarity output by the comparison engine 106 is used by the pairing engine 104 and/or the merge engine 108.

Figure 3:
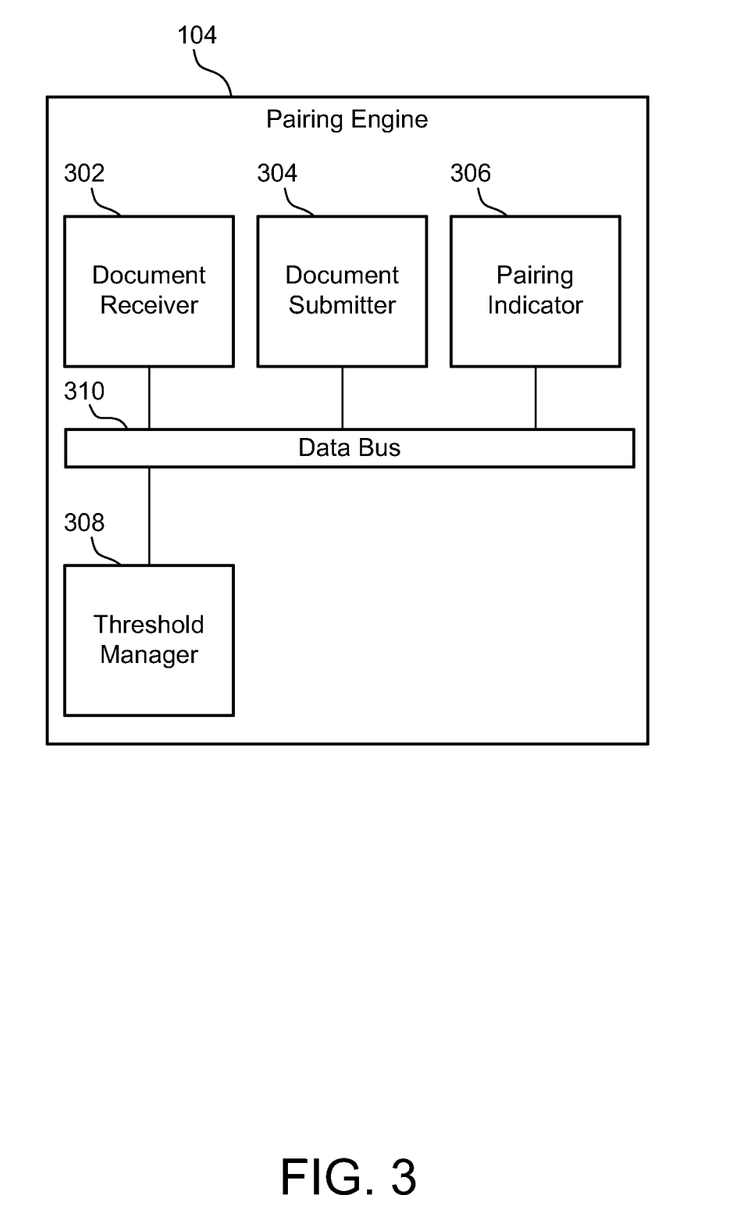
FIG. 3 depicts a schematic diagram of one embodiment of the pairing engine of FIG. 1.

FIG. 3 depicts a schematic diagram of one embodiment of the pairing engine 104 of FIG. 1. The pairing engine 104 includes a document receiver 302, a document submitter 304, a pairing indicator 306, a threshold manager 308, and a data bus 310. The pairing engine 104 determines a document from the document repository 102 that most closely pairings the new document.

The document receiver 302, in one embodiment, receives the new document to be paired with a document from the document repository 102. The document receiver 302 may receive the new document from a user or as part of an automated process. For example, a request for service may include descriptions of the plurality of requested sub-services. The request for service may be input into a process (not shown) that breaks the request for service into documents corresponding to the requested sub-services and submits the documents serially to the pairing engine 104 as new documents. In this example, the pairing engine 104 initiates a process that compares each sub-service to service descriptions in the document repository 102 to determine the closest pairing.

In some embodiments, the document submitter 304 submits the document received by the document receiver to the comparison engine 106. In one embodiment, the document submitter 304 submits the document to the comparison engine 106 and receives an indication of the closest pairing document in the document repository 102 from the comparison engine 106. In an alternative embodiment, the document submitter 304 submits the document to the comparison engine 106 and manages the comparison process. For example, the document submitter 304 may direct the comparison engine 106 to compare the document to each document in the document repository 102.

The pairing indicator 306, in one embodiment, indicates the document in the document repository 102 that most closely pairings the document received by the document receiver 302. In some embodiments, the pairing indicator 306 receives an indication from the comparison engine 106 indicating the most similar document in the document repository 106.

In one embodiment, the pairing indicator 306 flags the pairing document from the document repository 102. The flagged document is submitted to a user to confirm that the pairing is appropriate. For example, the paired document may be submitted to an administrator who can confirm that the documents pairing or indicate that the document does not pairing. In some embodiments, the pairing engine 104 restarts the pairing process excluding the previously paired document in response to an indication that the previously paired document is not a good pairing for the new document.

The threshold manager 308, in one embodiment, manages a threshold that indicates a minimum similarity that paired documents must have to be considered "similar." If the most similar document found by the comparison engine 106 has a similarity to the document received by the document receiver 302 below a threshold value, the pairing engine 104 indicates that there is no similar document in the document repository 102. The threshold may be any arbitrary number. For example, in one embodiment, the similarity generated by the comparison engine 106 may be a number between 0 and 1, and the threshold may be any arbitrary value between 0 and 1, such as 0.8. In this example, if the most similar document has a similarity with the submitted document of 0.9, the pairing engine would mark the most similar document as similar to the submitted document.

The data bus 310 provides a communication pathway within the pairing engine 104 for various elements of the pairing engine 104. The data bus 310 may be any type of data communication system, including, but not limited to, a hardware bus, a wired connection, a network, a mesh system, and a wireless communication system. In some embodiments, the data bus 310 may include a combination of types of data communication system.

Figure 4:
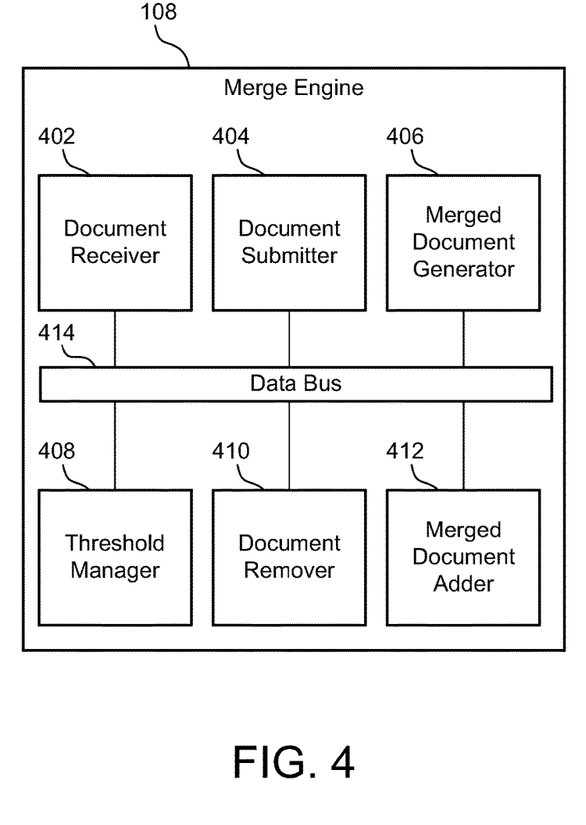
FIG. 4 depicts a schematic diagram of one embodiment of the merge engine 108 of FIG. 1.

FIG. 4 depicts a schematic diagram of one embodiment of the merge engine 108 of FIG. 1. The merge engine 108, in one embodiment, includes a document receiver 402, a document submitter 404, a merged document generator 406, a threshold manager 408, a document remover 410, a merged document adder 412, and a data bus 414. The merge engine 108 determines a document from the document repository 102 that most closely pairings the new document and merges it with the new document.

The document receiver 402, in one embodiment, receives the new document to be merged with a document from the document repository 102. The document receiver 402 may receive the new document from a user or as part of an automated process. For example, the new document may be a new service that has been created that is to be added to a service catalog. In another example, a service catalog to be merged with another service catalog may include a collection of services, each of the services in the catalog to be treated as a new service by the system 100. In these examples, each share of IC's to be merged with the service catalog is compared by the merge engine 108 to the existing services in the existing service catalog. If a close enough pairing is found to the new service in the existing service catalog, the new service is merged with the paired service. If a close enough pairing is not found, the new service is added to the service catalog.

In some embodiments, the document submitter 404 submits the document received by the document receiver to the comparison engine 106. In one embodiment, the document submitter 404 submits the document to the comparison engine 106 and receives an indication of the closest pairing document in the document repository 102 from the comparison engine 106. In an alternative embodiment, the document submitter 404 submits the document to the comparison engine 106 and manages the comparison process. For example, the document submitter 404 may direct the comparison engine 106 to compare the document to each document in the document repository 102.

In one embodiment, the merged document generator 406 generates a merged document from the new document and the closest pairing document in the document repository 102. The merged document generated by the merged document generator 406 includes elements of both the new document and the closest pairing document. In one embodiment, the merged document consists of the texts of both documents connected by a logically disjunctive phrase such as "or" or "The following is an alternative." In an embodiment in which documents have structure, the disjunction may be applied componentwise. In some embodiments, the merged document generator 406 generates a merged document only if the similarity between the two documents is relatively high. In one embodiment where similarity measures closeness, documents are merged only if their similarity is above a threshold value. In one embodiment where similarity measures distance, documents are merged only if their similarity is below a threshold value.

The threshold manager 408, in one embodiment, manages a threshold value indicating a minimum degree of similarity that must be met in order for documents to be merged. The threshold value may be any arbitrary value. For example, in one embodiment, the similarity generated by the comparison engine 106 may be a number between 0 and 1, and the threshold may be any arbitrary value between 0 and 1, such as 0.8. In this example, if the most similar document has a similarity with the new document of 0.9, the merged document generator 406 would merge the most similar document with the new document.

The document remover 410, in one embodiment, removes the most similar document from the document repository 102. The most similar document is removed by the document remover 410 if a merged document is generated by the merged document generator 406. Removing the document is a precursor to adding the merged document to the document repository 102 and is part of a process of limiting the presence of overlapping documents in the document repository 102.

In one embodiment, the merged document adder 412 adds the merged document to the document repository 102 after searching for additional pairings by treating the document as a new document to be paired with document repository 102. The action of the document remover 410 and the merged document adder 412 results in fewer redundant documents in the document repository 102 while maintaining descriptions of the documents cataloged by the document repository 102.

The data bus 414 provides a communication pathway within the merge engine 108 for various elements of the merge engine 108. The data bus 414 may be any type of data communication system, including, but not limited to, a hardware bus, a wired connection, a network, a mesh system, and a wireless communication system. In some embodiments, the data bus 414 may include a combination of types of data communication system.

Figure 5:
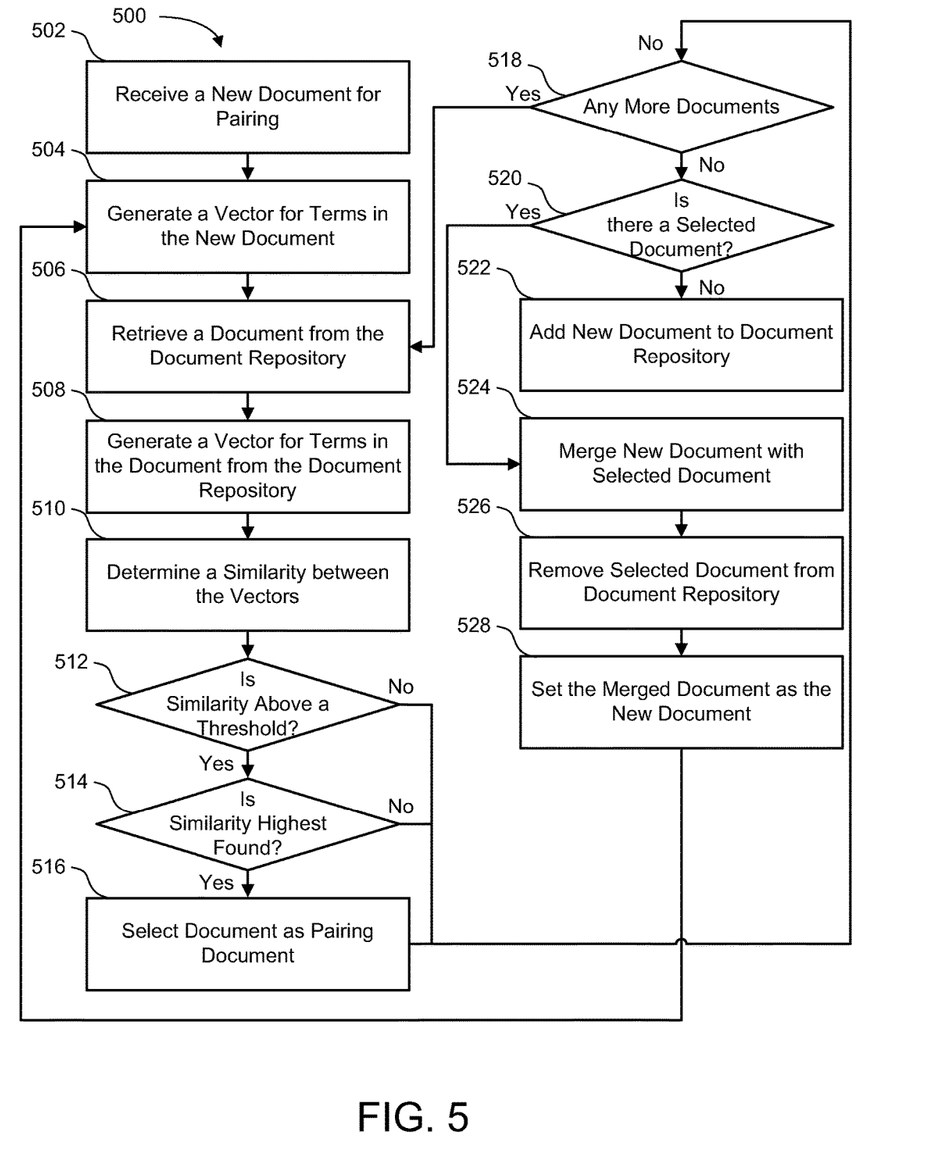
FIG. 5 is a flow chart diagram depicting one embodiment of a method for finding a pairing document.

FIG. 5 is a flow chart diagram depicting one embodiment of a method 500 for finding a pairing document. In the method 500, the document receiver 202 receives 502 a new document for pairing with a document in a document repository 102. The vector generator 206 generates 504 a vector for the new document. The generated vector has a number of elements equal to a number of terms of interest, and each element is a zero if the term does not occur in the document and a one if the term occurs at least once in the document.

The document retriever 204 retrieves 506 a document for comparison from the document repository 102. In some embodiments, the document retriever 204 retrieves 506 only documents that have not previously been compared to the new document.

The vector generator 206 generates 508 a vector for the new document. The generated vector has a number of elements equal to a number of terms of interest, and each element is a zero if the term does not occur in the document and a one if the term occurs at least once in the document.

The similarity generator 208 determines a similarity between the vector for the new document and the vector for the retrieved document. The determined 510 similarity is a numerical measure of similarity between the vectors. In one embodiment, the similarity determined 510 by the similarity generator 208 is a cosine measure of similarity.

The comparison engine 106 determines 512 if the similarity between the vectors is above a threshold managed by the threshold manager 308. If the similarity is above the threshold, the comparison engine 106 determines 514 if the similarity between the vectors is the highest similarity yet found between a vector for a document in the document repository 102 and the vector for the new document.

If the similarity is above the threshold and the similarity is the highest yet found, the retrieved document is selected 516 as a pairing document. If another document was previously selected 516 as a pairing document, but the current document has a higher similarity, the previously selected document is deselected.

If the similarity between the documents is not above the threshold, the similarity between the documents is not the highest yet found, or if the document is selected 516 as a pairing document, the comparison engine 106 determines 518 if any documents remain in the document store 102 that have not yet been compared with the new document. If the comparison engine 106 determines 518 that one or more documents remain uncompared, the method 500 returns to retrieve 506 an uncompared document from the document repository 102.

If the document has been submitted to the method 500 for a potential merger, and if the comparison engine 106 determines 518 that no documents remain uncompared, the merge engine 108 determines 520 if a document has been selected. If a document has not been selected, the merge engine 108 adds 522 the new document to the document repository 102.

If the merge engine 108 determines 520 that a document has been selected, the merged document generator 406 merges 524 the new document with the selected document. The document remover 410 removes 526 the selected document from the document repository 102. The merged document is set 528 by the merge engine 108 as the new document and the method 500 returns to step 504 to generate 504 a vector for terms in the new document (which, at this point, is the merged document).

It should also be noted that at least some of the operations for the methods may be implemented using software instructions stored on a computer useable storage medium for execution by a computer. As an example, an embodiment of a computer program product for merging a new document with a document from a plurality of documents includes a computer useable storage medium to store a computer readable program that, when executed on a computer, causes the computer to perform operations, including receiving a new document and, for each of the new document and each document of a plurality of documents, generating a vector uniquely associated with each of the documents of the plurality of documents and the new document. The vector includes a number of elements equal to a number of terms of interest. For each term of interest, an associated element value of the vector is assigned as zero if the term of interest does not occur in the document and one if the term does occur in the document. The operations also include, for each document from the plurality of documents, determining a similarity between the vector for the new document and the vector for the document from the plurality of documents. The operations also include selecting a document from the plurality of documents as related to the new document in response to determining that the similarity between the vector for the new document and the vector for the document from the plurality of documents is greater than or equal to a threshold value and determining that the similarity between the vector for the new document and the vector for the document from the plurality of documents is greater than or equal to the similarity between the vector for the new document and the vector for any other document from the plurality of documents. The operations also include merging the new document with the selected document if a document from the plurality of documents is selected.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for pairing a new document to a document from a plurality of documents in a document repository, comprising:

for each of the new document and the plurality of documents in the document repository, generating a vector uniquely associated with a document of the new document and the plurality of documents, wherein:
  the vector comprises a number of elements equal to a number of terms of interest; and
  for each term of interest, an associated element value of the vector is assigned as zero if the term of interest does not occur in the document and one if the term does occur in the document;
for each document from the plurality of documents, determining a similarity between the vector for the new document and the vector for the document from the plurality of documents comprising calculating a cosine measurement of similarity between the vector for the new document and the vector for the document from the plurality of documents;
if it is determined that the similarity between the vector for the new document and the vector for a document from the plurality of documents is greater than or equal to a threshold value then:
  selecting the document from the plurality of documents;
  generating a merged document by merging the new document with the document from the plurality of documents in response to the document from the plurality of documents being selected, wherein the merging comprises combining at least a portion of the new document with at least a portion of the selected document into the merged document;
  removing the selected document from the document repository and adding the merged document to the document repository; and
  generating a new vector for the merged document; and
if it is determined that the similarity is less than the threshold value then adding the new document to the document repository without merging the new document.

2. The computer-implemented method of claim 1, wherein selecting a document from the plurality of documents as related to the new document further comprises determining that the similarity between the vector for the new document and the vector for the selected document is as great as the similarity between the vector for the new document and the vector for any other document from the plurality of documents.

3. The computer-implemented method of claim 1, further comprising submitting the merged document as a new document for pairing.

4. The computer-implemented method of claim 1, wherein the associated element value for each term of interest is weighted based on a history of the term of interest in previous pairings.

5. The computer-implemented method of claim 1, wherein:
  the new document is a service description in an element of a request for service;
  documents of the plurality of documents are each a service description of a service offering available in a catalog of service offerings; and
  the selected document from the plurality of documents is a service offering determined to pair to the element of the request for service.

6. The computer-implemented method of claim 5, wherein each service description in the catalog of service offerings is compared to the service description in an element of a request for service, and a service description having the highest similarity is paired with the element of the request for service.

7. The computer-implemented method of claim 1, wherein the documents are short documents.

8. The computer-implemented method of claim 7, wherein the short documents consist of 500 words or less.

9. The computer-implemented method of claim 7, wherein the short documents consist of 50 words or less.

10. A non-transitory computer useable storage medium to store a computer readable program, wherein the computer readable program, when executed on a computer, causes the computer to perform operations for merging a new document with a document from a plurality of documents, the operations comprising:
  receiving a new document;
  for each of the new document and each document of a plurality of documents in a document repository, generating a vector uniquely associated with each of the documents of the plurality of documents and the new document, wherein:
    the vector comprises a number of elements equal to a number of terms of interest; and
    for each term of interest, an associated element value of the vector is assigned as zero if the term of interest does not occur in the document and one if the term does occur in the document;
  for each document from the plurality of documents, determining a similarity between the vector for the new document and the vector for the document from the plurality of documents;
  selecting a document from the plurality of documents as related to the new document in response to:
    determining that the similarity between the vector for the new document and the vector for the document from the plurality of documents is greater than or equal to a threshold value, wherein determining the similarity comprises calculating a cosine measurement of similarity between the vector for the new document and the vector for the document from the plurality of documents; and
    determining that the similarity between the vector for the new document and the vector for the document from the plurality of documents is greater than or equal to the similarity between the vector for the new document and the vector for any other document from the plurality of documents; and
  merging the new document with the selected document if a document from the plurality of documents is selected, wherein the merging comprises combining at least a portion of the new document with at least a portion of the selected document into a merged document;
  removing the selected document from the document repository and adding the merged document to the document repository; and
  generating a new vector for the merged document; and
  if it is determined that the similarity is less than the threshold value then adding the new document to the document repository without merging the new document with a document from the plurality of documents.

11. The computer useable storage medium of claim 10, wherein the new document comprises a plurality of terms arranged in a hierarchy, and further comprising weighting a term in the terms of interest based on a hierarchical level of the term.

12. A system comprising:

a document repository to store a plurality of documents;

a comparison engine comprising:

a vector generator to generate a vector for each of a new document and a document from the document repository, wherein:

the vector comprises a number of elements equal to a number of terms of interest; and         for each term of interest, an associated element value of the vector is assigned as zero if the term of interest does not occur in the document, and one if the term does occur in the document; and     a similarity generator to determine a similarity between the document and the document from the document repository, the similarity based on the vector for the new document and the vector for the document from the document repository, wherein to determine the similarity between the document and the document from the document repository comprises calculating a cosine measurement of similarity between the vector for the new document and the vector for the document from the plurality of documents; and a pairing engine comprising:

a document receiver to receive the new document to be paired with the documents in the document repository;

a document submitter to submit the new document to the comparison engine and direct the comparison engine to determine a similarity between the new document and each document of the plurality of documents in the document repository; and     a pair indicator to indicate a pairing between the new document and a document in the document repository having the highest similarity with the new document if the similarity between the new document and the document in the document repository having the highest similarity with the new document is greater than or equal to a threshold value; and a merge engine comprising:

a document receiver to receive a new document to be incorporated with the documents in the document repository;

a document submitter to submit the new document to the comparison engine and direct the comparison engine to determine a similarity between the new document and each document of the plurality of documents in the document repository;

a merged document generator to generate a merged document by combining at least a portion of the new document with at least a portion of a document in the document repository having the highest similarity with the new document if the similarity between the new document and the document in the document repository having the highest similarity with the new document is greater than or equal to a threshold value;

a document remover to remove the document in the document repository having the highest similarity with the new document; and     a merged document adder to add the merged document to the document repository;

wherein the vector generator further generates a new vector for the merged document.

13. The system of claim 12, wherein the merge engine is further configured to:

submit the merged document as a new document to the pairing engine.

14. The computer-implemented method of claim 1, wherein the associated element value for each term of interest is weighted based on a position of the term of interest in the document.

15. The computer-implemented method of claim 1, wherein the associated element value for each term of interest is weighted based on a position of the term of interest in relation to a predetermined term.

16. The computer-implemented method of claim 1, wherein the associated element value for each term of interest is weighted based on a position of the term of interest within a structural hierarchy of the document.

\* \* \* \* \*